United States Patent [19]

Yach

[11] Patent Number: 5,606,511
[45] Date of Patent: Feb. 25, 1997

[54] MICROCONTROLLER WITH BROWNOUT DETECTION

[75] Inventor: Randy L. Yach, Phoenix, Ariz.

[73] Assignee: Microchip Technology Incorporated, Chandler, Ariz.

[21] Appl. No.: 368,919

[22] Filed: Jan. 5, 1995

[51] Int. Cl.⁶ .................................................. G01R 19/00
[52] U.S. Cl. ........................... 364/483; 395/750; 364/492
[58] Field of Search .................................. 364/492, 483, 364/493, 550, 579; 395/750, 550; 371/67.1; 340/660–663

[56] References Cited

U.S. PATENT DOCUMENTS

| | | | |
|---|---|---|---|
| 4,363,092 | 12/1982 | Abo | 364/200 |
| 4,433,390 | 2/1984 | Carp | 364/900 |
| 4,464,584 | 8/1984 | Hentzschel | 307/200 A |
| 4,551,841 | 11/1985 | Fujita | 371/66 |
| 4,766,567 | 8/1988 | Kato | 364/900 |
| 4,788,661 | 11/1988 | Morita | 364/900 |
| 4,843,592 | 6/1989 | Tsuaski | 364/900 |
| 4,992,951 | 2/1991 | Glowczewski | 364/483 |
| 5,019,996 | 5/1991 | Lee | 364/483 |
| 5,047,987 | 9/1991 | Kosuge | 365/228 |
| 5,151,854 | 9/1992 | Adams | 364/184 |
| 5,237,698 | 8/1993 | Ohmae | 395/750 |
| 5,400,341 | 3/1995 | Makino et al. | 371/12 |

*Primary Examiner*—James P. Trammell
*Attorney, Agent, or Firm*—Wigman, Cohen, Leitner & Myers, P.C.

[57] ABSTRACT

A microcontroller device is fabricated in a semiconductor integrated circuit chip to control an external system with which the device is to be installed in circuit. The device has a CPU, a program memory for storing program instructions to be implemented by the CPU, a data memory for storing data including data pertaining to parameters of the external system to be controlled by operation of the CPU according to the instructions, and various peripherals. A brown-out protection circuit monitors the level of the supply voltage for the IC chip relative to a ground reference level, to reset the device as protection against its malfunction in response to reduction of an arithmetic difference between the supply voltage level and the ground reference level to a value less than a predetermined threshold operating voltage level. Reset defines a cessation of operation of the device while maintaining status quo of implementation of program instructions by the CPU and data stored in the data memory. A discriminator distinguishes between a reduction representative of a brown-out event warranting invoking a reset of the device and a reduction representative of mere transitory voltage swings commonly occurring in the device operation not warranting invoking a reset of the device. This serves to avoid both malfunctions and unnecessary resetting of the device in control of the external system.

20 Claims, 3 Drawing Sheets

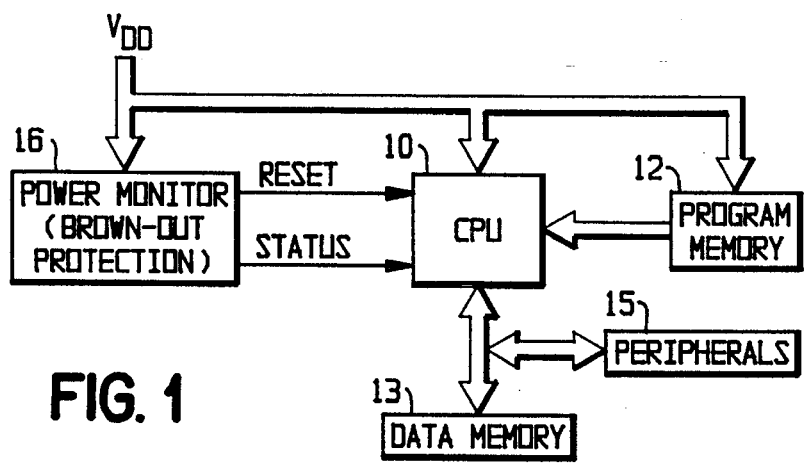
FIG. 1
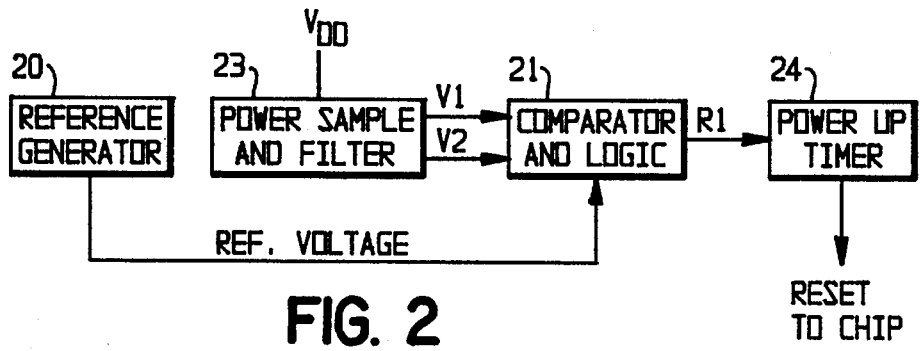
FIG. 2
FIG. 3A
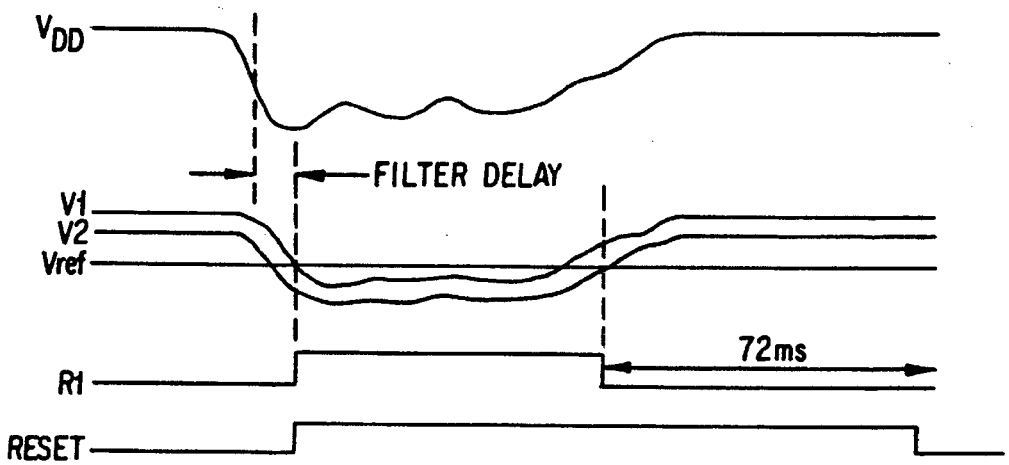

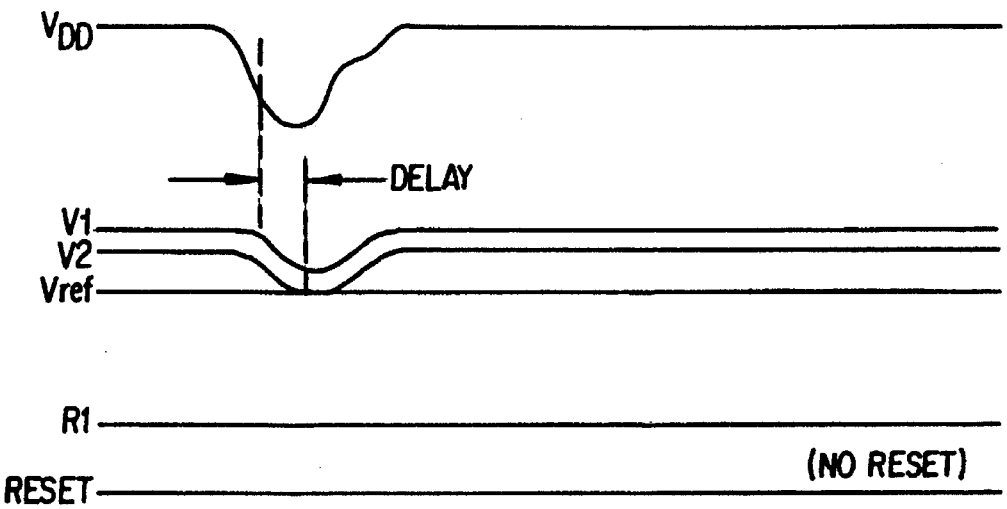
FIG. 3B
FIG. 4
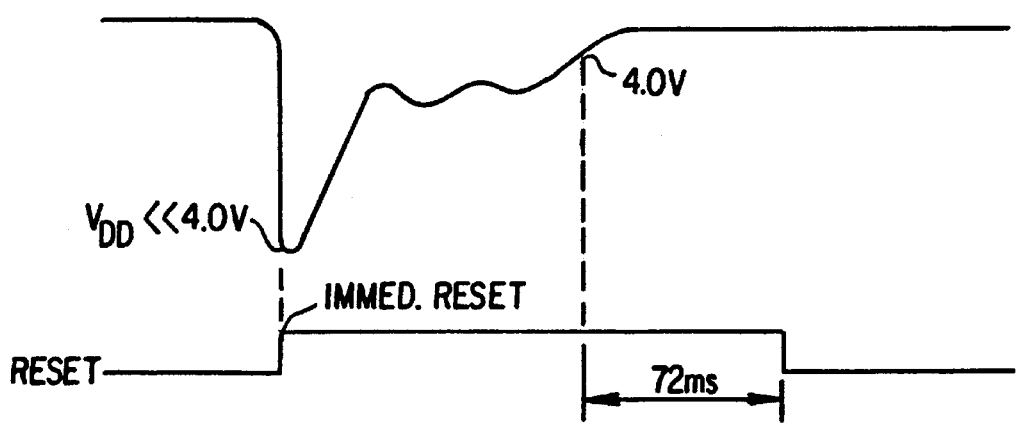

MICROCONTROLLER WITH BROWNOUT DETECTION

BACKGROUND OF THE INVENTION

The present invention relates generally to semiconductor devices, and more particularly to a semiconductor microprocessor or microcontroller with protection against low supply voltage.

Low supply voltage on a semiconductor microcontroller chip (device), that is, a supply voltage that falls below the minimum acceptable value or level necessary for proper operation of the chip or end system (i.e., necessary to avoid a malfunction), can be especially serious for sensitive applications, such as an automotive anti-lock braking system. For that reason, microcontroller chips have typically been provided with 'brown-out protection'—protection against not a complete loss of power but a reduction in power supply level sufficient to cause malfunction of the circuit or system. Applications that require brown-out protection generally are systems with a controlled power supply and not battery driven.

Theoretically, brown-out protection should reset the microcontroller chip or system at any time that $V_{DD}$ falls below the minimum acceptable value. However, this minimum $V_{DD}$ value will depend upon the operating frequency of the device or other system constraints. For example, the critical value ($V_{DDmin}$) may be 4.0 volts (V) at 20 megahertz (MHz) operation, and only 1.8 V at 4 MHz.

For that and other reasons, brown-out requirements may be qualified by market considerations, i.e., the specific application in which the device is to be used. Applications that require brown-out protection fall into many categories, such as appliances, industrial control, and automotive applications. Operational (plugged-in) appliances encounter brown-out situations during line voltage dip. Peripheral voltage sensitive elements will malfunction at that time even though the appliance may not be turned on for its primary function. Automotive electronics encounter brown-out situations when the ignition is turned on. For example, the automobile radio may be turned on by the ignition key just as the starter is engaged, causing the power supply to drop. The affected device must reset or it may be left in an unstable state.

Brown-out is not applicable in low voltage battery applications where power consumption, operating frequency, and noise are at a relative minimum.

One may then define brown-out for the situation in which $V_{DD}$ falls to or below a predetermined voltage threshold level. Because microcontrollers operate at high speeds, it is important to also distinguish a real brown-out from normal I/O switching noise which may last as long as 200 nanoseconds (ns). In the circumstances noted above, for a 5 V supply, for example, if $V_{DD}$ falls below a level of 4.0 V for more than 200 ns, then brown-out detect should trigger to reset the chip.

Problems arise, however, in situations of relatively shallow dips of the supply voltage below the specified voltage threshold level, whether as an isolated excursion or a sequence of slight excursions of $V_{DD}$ below and then back above the threshold. In such instances, whether attributable to noise, I/O switching, or other line perturbations, the brown-out detection circuit typically initiates an immediate reset of the microcontroller chip on the first occasion and, if there is no further recurrence within a set period, reestablishes operation of the chip promptly after the set period expires. This, of course, results in disruption of the operation of the microcontroller when there is no need for a reset. Also, if $V_{DD}$ drops to the trip voltage and remains there for a lengthy period, the circuit may oscillate with attendant unstable operation.

It is a principal object of the present invention to provide a brown-out detection circuit which is capable of analyzing the nature of supply voltage dips, and of applying predetermined criteria and hysteresis to the determination of whether or not a reset should be initiated each time the supply voltage drops below a threshold level.

SUMMARY OF THE INVENTION

Ideally, in microcontroller applications, the brown-out protection should reset the microcontroller whenever the supply voltage drops below a predetermined value. Brown-out typically applies to applications in which the microcontroller is used with a controlled power supply rather than a battery, so the voltage range of interest is the supply system voltage ±a delta value.

The present invention employs a three-section CMOS-fabricated brown-out detection and correction circuit as a portion of the microcontroller chip. One section of the brown-out circuit is a voltage reference circuit constituting a precise voltage reference. A second section of the circuit is a dual comparator circuit which has the voltage reference as one input and filtered power supply sample level as another input. The dual comparator is responsible for the circuit hysteresis and keeps the circuit from oscillating. The third section comprises a signal filter and supply tracking mechanism used to sample the supply level and to determine whether the brown-out is of a type to generate a reset.

According to the invention, this final section of the brown-out circuit includes a built-in sensor which serves to filter out the depth of the $V_{DD}$ spikes with the frequency. If a spike is below the specified threshold level and very deep, the brown-out detect circuit will cause the chip to be reset immediately, subject to the power-up timer timeout interval. On the other hand, if the spike is relatively shallow, or at a very high frequency, the brown-out detect circuit will respond more slowly and consequently may not reset the chip. This is highly desirable in an application because it precludes a resetting of the device as a consequence of noise or other minor perturbations alone. In essence, the circuit filters out normal noise, but reacts quickly to trigger reset if a true brown-out condition is detected.

Once in reset, the circuit uses hysteresis to eliminate oscillations and holds the device in reset until the power supply returns to normal operating voltage level, at which time a power-up timer is invoked to maintain the reset condition for a fixed time interval. Hysteresis greatly assists the dual comparator to distinguish a true brown-out event from normal noise or other slight perturbations, and is achieved by dual sampling of the power supply and establishing a pair of trip points for comparison with excursions of the supply voltage level.

In a preferred embodiment, the microcontroller device is fabricated in a semiconductor integrated circuit (IC) chip to control an external system with which the device is to be installed in circuit. The microcontroller includes a central processing unit (CPU), a program memory for storing program instructions to be implemented by the CPU, a data memory for storing data including data pertaining to parameters of the external system to be controlled by operation of the CPU according to the instructions, and various peripherals. A brown-out protection circuit monitors the chip supply voltage level relative to a ground reference level, and operates to reset the device to protect it against malfunction in the event of a reduction of the difference between the supply voltage and ground reference levels to a value less than a predetermined threshold operating voltage level. Reset causes operation of the device to be halted while the status quo of implementation of program instructions by the CPU and data stored in the data memory is maintained as it was at the time of occurrence of the reset.

Discrimination means of the brown-out protection circuit distinguishes between a reduction of the aforesaid voltage difference representative of a brown-out event warranting invoking a reset of the device, and a reduction representative of mere transitory voltage swings commonly occurring in the device operation not warranting invoking a reset of the device. Consequently, both malfunctions and unnecessary resetting of the device during performance of its control function on the external system are avoided. The discrimination means includes filter means for delaying response of the brown-out protection circuit to each reduction representative of the commonly occurring transitory voltage swings, so as to allow a transitory voltage swing to expire before restoration of normal device operating voltage level.

The filter means includes sample filters that derive from the chip supply voltage a pair of sample values for establishing, in response to supply voltage fluctuations relative to the lower of the sample values, when a reset should be invoked and, in response to supply voltage fluctuations relative to the higher of the sample values, when the invoked reset should be terminated. The dual sample also provides hysteresis means coupled to the sample filters and adapted to be adjusted to a value related to the pair of sample values to remove oscillations in circuit response. A power-up timer responds to a supply voltage fluctuation at a second point in time, at which the other sample value establishes when a reset should be terminated, to maintain the device in reset condition for a predetermined time interval, and thereafter restores device operation at a point corresponding to the status quo at which the reset was initially invoked.

BRIEF DESCRIPTION OF THE DRAWINGS

The above and still further objects, features, aspect and attendant advantages of the invention will become apparent from a consideration of the following detailed description of the presently contemplated best mode of practicing the invention, with reference to a preferred embodiment, taken in conjunction with the accompanying drawings in which:

FIG. 1 is a simplified block diagram of a microcontroller chip with certain peripheral components including a brown-out detector;

FIG. 2 is a simplified block diagram of a brown-out detector circuit for use in the microcontroller of FIG. 1, according to the invention;

FIGS. 3A and 3B are graphs illustrating the internal operation of the power monitor circuit in the microcontroller device of FIG. 1;

FIG. 4 is a graph illustrating a deep $V_{DD}$ drop and immediate reset;

DETAILED DESCRIPTION OF THE PREFERRED EMBODIMENT AND METHOD

Figure 5A:
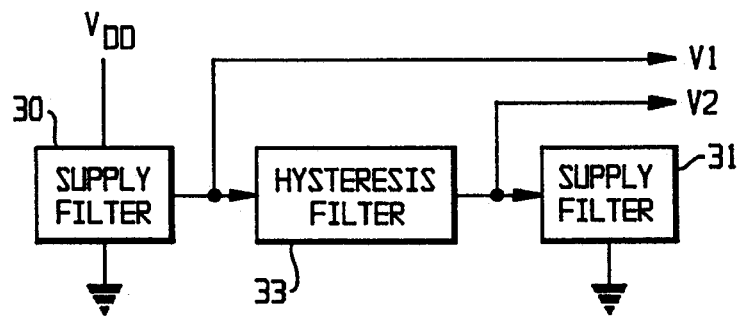
FIGS. 5A and 5B are a simplified block diagram and a somewhat more detailed circuit schematic diagram, respectively, of a signal filter and sample circuit used in the brown-out detector of the invention.

Referring to FIG. 1, an exemplary microcontroller device employing the principles of brown-out protection according to the present invention includes Central Processing Unit (CPU) 10, program memory 12, data memory 13, and various peripherals shown as a block 15. Power is supplied to the system from a source designated as $V_{DD}$. A power monitor 16, or brown-out detector, is connected to the power supply to assess the instantaneous level of $V_{DD}$, and, if it falls below a predetermined minimum acceptable value, to detect that situation and thereupon reset the device. As pointed out above, however, the level of $V_{DD}$ depends in part on the frequency of I/O switching characteristics of the device.

Power monitor 16, therefore, is adapted to respond to a situation in which $V_{DD}$ drops below the designated minimum acceptable level for a predetermined time interval that depends on normal acceptable noise frequencies. Although the brown-out detection should reset the chip in those circumstances, it is important to avoid resetting where perturbations in $V_{DD}$ that may be attributable to noise or I/O switching drive the voltage level momentarily below and then back up to or above this threshold value. The power monitor is specifically designed to delay any reset of the microcontroller device that may unnecessarily cause disruption or instability of system operation.

As shown in FIG. 2, the power monitor is a brown-out detection and correction circuit that comprises three sections, one of which is a precise voltage reference generator 20. The precise reference voltage is set at a stable voltage output, applied to a comparator circuit 21. The comparator and associated logic circuitry are designed to compare the precise reference voltage output of generator 20 against an equalized sample of the instantaneous level of $V_{DD}$ at any given time. However, the comparison must be undertaken and accomplished in a way that will avoid the aforementioned unnecessary and potentially failure-causing disruptions or oscillations of system operation. This is particularly important in applications where personal injury or property damage may be a consequence of such disruption or instability, such as with anti-lock braking systems (ABS) in automobiles.

A power sample and filter circuit 23 is employed to measure and periodically sample the $V_{DD}$ level, but also to filter out spikes which take $V_{DD}$ below the reference level, and to perform the filter function according to the I/O switching frequency characteristics of the microcontroller device operation. In operation, if a deep drop (negative spike) in $V_{DD}$ occurs in a voltage sample, the comparator logic of circuit 21 reacts to the deviation from the reference voltage to reset the microcontroller with an output R1, based on a pair of sample voltages V1 and V2 from circuit 23. A circuit 24 to which output R1 is applied includes a power-up timer with a timeout interval selected as necessary for system stabilization. In instances where only a shallow spike or a series of spikes occurring at high frequency (relative to the microcontroller I/O switching characteristics) is detected, the filtering function performed by circuit 23 produces a variably slower response of the voltages V1 and V2, so that the triggering of a reset is much less likely than in the sudden deep spike circumstance.

Some examples of this operation are illustrated in FIGS. 3A and 3B. For oscillation protection, a detection range is selected having upper and lower voltage threshold limits V1 and V2, respectively, based on a delta difference from a threshold level displaced a certain voltage from the normal voltage level of $V_{DD}$. A reference voltage VRef is used for comparison. For a 5 V supply, for example, a permissible drop may be 1.0 V with a delta of ±0.2 V. V1, then, is selected to cross VRef when $V_{DD}$=4.2 V and V2 is selected to cross VRef when $V_{DD}$=3.8 V. Based on normal high frequency noise characteristics for a microcontroller, the predetermined delay time interval of 200 ns to initiate reset of the chip is imposed by the filter starting from the time $V_{DD}$ falls below VRef until V1 drops below VRef.

The chip is then driven into reset and held there until $V_{DD}$ returns to a level indicative of restoration of power. At that point, the power-up timer of the brown-out detector circuit is invoked to maintain the chip in reset for a time interval of 72 milliseconds (ms). In the example of FIG. 3A, that occurrence is measured from the point in time that $V_{DD}$ achieves a level such that V2 again exceeds VRef.

On the other hand, the example of FIG. 3B illustrates that the V1/V2 delay introduced by the filter results in fast disturbances being ignored. In this instance, the chip does not undergo reset.

In the circumstances shown in FIG. 4, a relatively deep spike in $V_{DD}$ results in an immediate reset of the microcontroller chip. The reset condition is then maintained for a 72 ms timeout interval after the power is restored to a level corresponding to that of FIG. 3A in which V2 exceeds VRef.

Figure 5B:
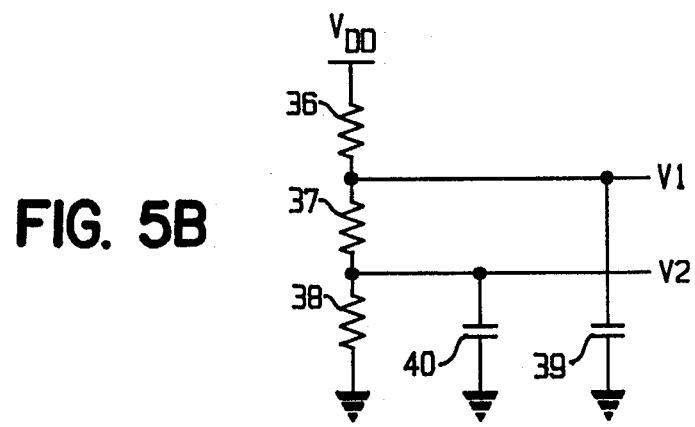

The filter network of the sample and filter circuit 23 is illustrated in block diagrammatic form in FIG. 5A. A pair of supply filters 30 and 31 provide the levels V1 and V2, respectively, to the comparator circuit 21 (FIG. 2). The $V_{DD}$ supply voltage relative to ground reference level is used by supply filter 30 to derive voltage level V1, and another voltage level V2 is derived from the combination of supply filter 31 and hysteresis filter 33. In the circuit schematic of FIG. 5B, voltage V1 is derived between electrical resistances 36 and 37 of three resistances (the third being resistance 38) in series between $V_{DD}$ and ground, and a circuit node of the hysteresis filter at a capacitance 39 to ground. Voltage level V2 is taken from a node between resistances 37 and 38 from which another capacitance 40 of the hysteresis filter is grounded. The circuits in which the two capacitances are located comprise a pair of matched RC filters. It will be apparent, then, that voltages V1 and V2 vary with each fluctuation of $V_{DD}$.

Because the brown-out detector (power monitor) 16 monitors the power supply $V_{DD}$, it also automatically monitors the ground reference level, as voltages are always measured between two nodes. This can be undesirable since normal ground noise might cause a reset of the microcontroller device, but sample and filter circuit 23 prevents this from occurring because the matched RC filters connected to ground serve, among other things, to filter out the normal ground noise. Thus, the same filtering mechanism for the supply side is employed on the ground side (i.e., the circuit of FIG. 5A (or 5B) affects both sides in the same way) so that the ground level is also sampled and may reset the chip only if the difference in level between $V_{DD}$ and ground is less than the trip voltage that would initiate a reset (i.e., if $V_{DD}$–Gnd≦$V_{bo}$, where $V_{bo}$ is the brown-out voltage).

Figure 6:
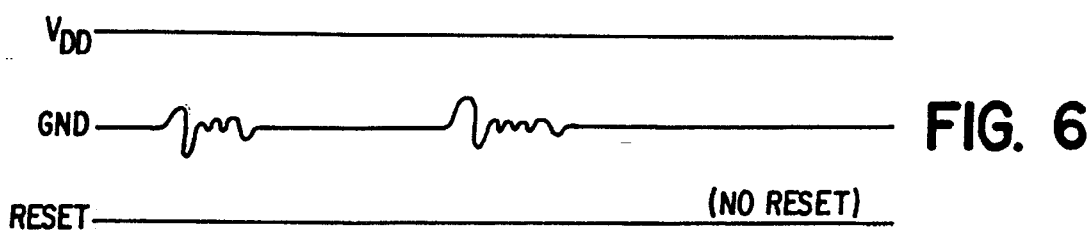
FIG. 6 is a graph illustrating normal ground noise with no reset.
Figure 7:
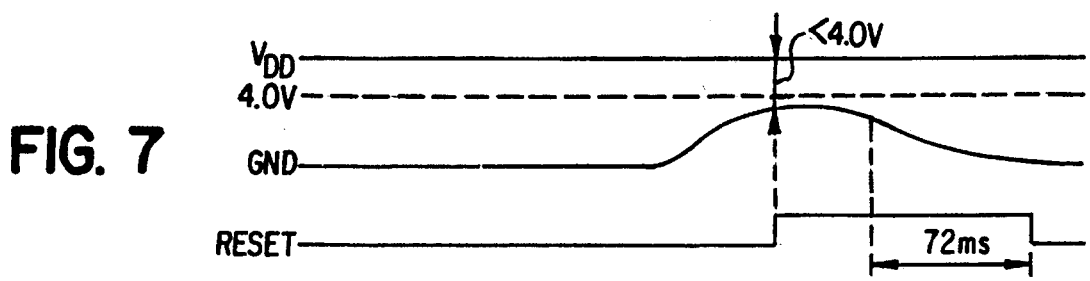
FIG. 7 is a graph illustrating an increase in ground reference level that causes a reset.

FIG. 6 illustrates the situation in which normal ground noise is occurring, but because the difference between $V_{DD}$ and ground is not less than $V_{bo}$, there is no reset. In FIG. 7, on the other hand, there is a point at which their difference becomes equal to (and ultimately less than) the trip voltage, and at that point a reset condition occurs.

When the microcontroller chip is in the reset condition, the circuit of FIG. 5A operates, by virtue of the hysteresis filter 33, to dampen out oscillations and to maintain the chip in the reset condition until $V_{DD}$ is restored to its normal operating level (i.e., $V_{DD}$–Gnd>$V_{bo}$). At that point, the power-up timer 24 (FIG. 2) in the brown-out detector circuit is invoked to initiate its fixed time-out interval, to hold the microcontroller chip in reset. When that interval expires (i.e., the power-up timer times out), the chip is removed from reset. Thus, the application of hysteresis serves to differentiate the occurrence of an actual brown-out event from the presence of normal noise or switching transients on the power supply (or ground reference).

The hysteresis is derived from sampling $V_{DD}$ by the two supply filters, which creates trip points for initiating an internal reset (when $V_{DD}$ drops so that V1<VRef) and initiating the power-up timer interval (when $V_{DD}$ rises so that V2>VRef). Consequently, the trip points equate to: V1>$V_{bo}$>V2. In the illustrative embodiment of the invention, if the brown-out voltage $V_{bo}$ is approximately 4.0 V, the hysteresis level (which is not greater than V2–V1) may have a value of, say, 0.1 V.

Although the best mode presently contemplated for practicing the invention has been described in terms of a presently preferred embodiment and method, it will be apparent to those skilled in the relevant field that variations and modifications may readily be implemented without departing from the true spirit and scope of the invention. Accordingly, it is intended that the invention should be limited only by the appended claims and the pertinent rules of applicable law.

What is claimed is:

1. In a microcontroller device fabricated in a semiconductor integrated circuit (IC) chip for controlling an external system with which the device is to be installed in circuit, and having a central processing unit (CPU), a program memory for storing program instructions to be implemented by the CPU, a data memory for storing data including data pertaining to parameters of the external system to be controlled by operation of the CPU according to said instructions, means for providing a supply voltage to operate the IC chip, said supply voltage being defined by a voltage level relative to a ground reference level, and brown-out detection means for monitoring the supply voltage level relative to the ground reference level to reset said device as protection against malfunction thereof in response to reduction of an arithmetic difference between the supply voltage level and the ground reference level to a value less than a predetermined threshold operating voltage level, wherein reset defines a cessation of operation of the device while maintaining status quo of implementation of program instructions by the CPU and data stored in the data memory as at the time of occurrence of the reset, the improvement comprising discrimination means for distinguishing between a reduction representative of a brown-out event warranting invoking a reset of said device and a reduction representative of mere transitory voltage swings commonly occurring in the device operation not warranting invoking a reset of said device, and means for suppressing said brown-out detection means from resetting said device when said reduction of the difference between the supply voltage level and the ground reference level represents a transitory voltage swing not warranting invoking a reset, whereby to avoid both malfunctions and unnecessary resetting of the device in control of the external system.

2. The improvement of claim 1, wherein said discrimination means includes filter means for delaying response of said brown-out detection means to each reduction representative of said commonly occurring transitory voltage swings, whereby to allow a transitory voltage swing to expire before restoration of normal device operating voltage level.

3. The improvement of claim 2, wherein said filter means includes sample filters coupled to said supply voltage means to derive from said supply voltage a pair of sample values for establishing, in response to supply voltage fluctuations relative to one of the sample values, when a reset should be invoked and, in response to supply voltage fluctuations relative to the other of the sample values, when the invoked reset should be terminated.

4. The improvement of claim 3, wherein said filter means further includes hysteresis means coupled to said sample filters and adapted to be adjusted to a value related to said pair of sample values to add a corresponding delay interval to a first point in time at which said one sample value establishes when a reset should be invoked.

5. The improvement of claim 4, wherein said brown-out detection means further includes timer means responsive to a supply voltage fluctuation at a second point in time at which said other sample value establishes when a reset should be terminated, for maintaining said device in reset condition for a predetermined time interval, and for thereafter restoring device operation at a point corresponding to the status quo at which the reset was initially invoked.

6. The improvement of claim 1, wherein said brown-out detection means further includes timer means responsive to restoration of normal device operating voltage level following a reset of said device, for maintaining said device in reset condition for a predetermined time interval, and for thereafter restoring device operation from a point corresponding to the status quo at which the reset was initially invoked.

7. A microcontroller device including a microprocessor, memory and peripherals for controlling a controlled system, and a source of supply voltage for operating said microprocessor, memory and peripherals; further including brown-out protection means for monitoring the supply voltage to invoke a reset of said microcontroller device in avoidance of malfunction thereof when the supply voltage level fluctuates below a predetermined threshold operating voltage level, wherein reset defines a halt in the operation of the microcontroller device while freezing status quo of said microprocessor, memory and peripherals at the point of halt of the operation, said brown-out protection means including means for selectively disabling response of said brown-out protection means to supply voltage level fluctuations, otherwise tending to invoke a reset of said microcontroller device, which are only attributable to noise or switching transients normally encountered in said microcontroller device operation, whereby to avoid both malfunctions and unnecessary resetting of the microcontroller device during control of the controlled system.

8. The microcontroller device of claim 7, wherein said selective disabling means includes delay means for delaying response to fluctuations attributable to noise or switching transients, whereby to enhance restoration of normal device operating voltage level without suspending operation of said microprocessor, memory and peripherals.

9. The microcontroller device of claim 8, wherein said delay means includes sampling means responsive to said supply voltage to derive therefrom a plurality of sample values for establishing different levels of supply voltage fluctuations to invoke a reset and to terminate a reset.

10. The microcontroller device of claim 9, wherein said sampling means further includes hysteresis means electrically connected to said sampling means to displace both of said sample values by a variable amount to correspondingly delay invocation of a reset.

11. The microcontroller device of claim 10, wherein said brown-out protection means further includes timer means responsive to one of said different levels of supply voltage fluctuation to terminate a reset, for maintaining said microcontroller device in reset condition for a predetermined time interval, and for thereafter restoring device operation at a point corresponding to the status quo at which operation was halted.

12. In a microcontroller device fabricated in a semiconductor integrated circuit (IC) chip for controlling an external system with which the device is to be installed in circuit, and having a central processing unit (CPU), a program memory for storing program instructions to be implemented by the CPU, a data memory for storing data including data pertaining to parameters of the external system to be controlled by operation of the CPU according to said instructions, means for providing a supply voltage to operate the IC chip, said supply voltage being defined by a voltage level relative to a ground reference level; a device-implemented method of brown-out protection comprising the steps of monitoring the supply voltage level relative to the ground reference level to reset said device as protection against malfunction thereof in response to reduction of an arithmetic difference between the supply voltage level and the ground reference level to a value less than a predetermined threshold operating voltage level, wherein reset defines a cessation of operation of the device while maintaining status quo of implementation of program instructions by the CPU and data stored in the data memory; discriminating between a reduction representative of a brown-out event warranting invoking a reset of said device and a reduction representative of mere transitory voltage swings commonly occurring in the device operation not warranting invoking a reset of said device, and suppressing a reset of said device when the reduction of the difference between the supply voltage level and the ground reference level represents a transitory voltage swing not warranting invoking a reset, whereby to avoid both malfunctions and unnecessary resetting of the device in control of the external system.

13. The method of claim 12, wherein the step of discriminating includes delaying response to each reduction representative of said commonly occurring transitory voltage swings, whereby to allow a transitory voltage swing to expire before a return to normal device operating voltage level.

14. The method of claim 13, wherein the step of delaying includes deriving from said supply voltage a pair of sample values for establishing, in response to supply voltage fluctuations relative to one of the sample values, when a reset should be invoked and, in response to supply voltage fluctuations relative to the other of the sample values, when the invoked reset should be terminated.

15. The method of claim 14, wherein the step of delaying further includes using hysteresis to add a corresponding delay interval to a first point in time at which said one sample value establishes when a reset should be invoked.

16. The method of claim 15, further including the step, in response to a supply voltage fluctuation at a second point in time at which said other sample value establishes when a reset should be terminated, of maintaining said device in reset condition for a predetermined time interval, and thereafter restoring device operation at a point corresponding to the status quo at which the reset was initially invoked.

17. The method of claim 12, including responding to restoration of normal device operating voltage level following a reset of said device, for maintaining said device in reset condition for a predetermined time interval, and thereafter restoring device operation from a point corresponding to the status quo at which the reset was initially invoked.

18. A microcontroller device with a power supply and a brown-out detection and correction circuit for resetting the device, said brown-out circuit comprising a voltage reference for providing a precise reference level; a dual comparator for comparing a pair of inputs; means supplying the voltage reference level as a first input to said comparator; means supplying a filtered sample level of the power supply as a second input to said comparator and for providing hysteresis and preventing oscillation of the brown-out circuit; and signal filter supply tracking means for determining from a sampled level of the power supply whether deviations of the power supply level from said voltage reference level are of a type to generate a reset.

19. The microcontroller of claim 18, wherein said signal filter supply tracking means includes sensor means for detecting the magnitude and frequency of fluctuations of the power supply for enabling the brown-out circuit to promptly reset the device when a fluctuation drops significantly below the voltage reference level, and for delaying response of the brown-out circuit when a fluctuation is relatively shallow and at relatively high frequency to inhibit a reset of the device, whereby to suppress resetting the device as a consequence of noise or other minor perturbations alone.

20. The microcontroller of claim 18, wherein said means supplying a filtered sample level of the power supply is responsive to a reset of the device for providing hysteresis by establishing a pair of trip points for comparison with excursions of the power supply level, to eliminate oscillations of the brown-out circuit, and for holding the device in reset until the power supply level returns to at least the voltage reference level and for a predetermined time interval thereafter.

* * * * *